(12) United States Patent
Matsunaga et al.

(10) Patent No.: US 7,966,916 B2
(45) Date of Patent: Jun. 28, 2011

(54) TOOL LOCKING SYSTEM

(75) Inventors: Douglas Matsunaga, Libertyville, IL (US); Jack Odrowaz, Buffalo Grove, IL (US)

(73) Assignee: Braner USA, Inc., Schiller Park, IL (US)

( * ) Notice: Subject to any disclaimer, the term of this patent is extended or adjusted under 35 U.S.C. 154(b) by 42 days.

(21) Appl. No.: 12/730,964

(22) Filed: Mar. 24, 2010

(65) Prior Publication Data

US 2010/0175529 A1 Jul. 15, 2010

Related U.S. Application Data

(63) Continuation of application No. 11/754,100, filed on May 25, 2007, now abandoned.

(51) Int. Cl.
*B23B 3/36* (2006.01)
*B23B 29/00* (2006.01)

(52) U.S. Cl. .......................................... 82/152; 82/157

(58) Field of Classification Search ................. 82/152, 82/151, 154, 157; 72/238, 229; 29/65, 40, 29/41, 48.5 R
See application file for complete search history.

(56) References Cited

U.S. PATENT DOCUMENTS

| 3,463,044 | A | | 8/1969 | Rossman et al. | |
|---|---|---|---|---|---|
| 5,450,740 | A | | 9/1995 | Lovinggood et al. | |
| 5,720,195 | A | * | 2/1998 | Ruple | 72/238 |
| 5,887,472 | A | * | 3/1999 | Abbey, III | 72/238 |
| 5,899,252 | A | | 5/1999 | Pozzo | |
| 6,637,997 | B2 | | 10/2003 | Ahms et al. | |

OTHER PUBLICATIONS

Page from sales literature, Bullentin No. 107; Jerry Tools, Inc., 6200 Vine Street, Cincinnati, OH 45216, Feb. 1, 1984.

* cited by examiner

*Primary Examiner* — Will Fridie, Jr.
(74) *Attorney, Agent, or Firm* — Botkin & Hall, LLP

(57) ABSTRACT

A locking system for securing tools on an arbor. The locking system has a collar attached to the arbor, with the collar spaced from the tooling. A nut is placed over the collar and positioned next to the tools. The nut is then rotated to secure the nut between the collar and the tools.

1 Claim, 3 Drawing Sheets

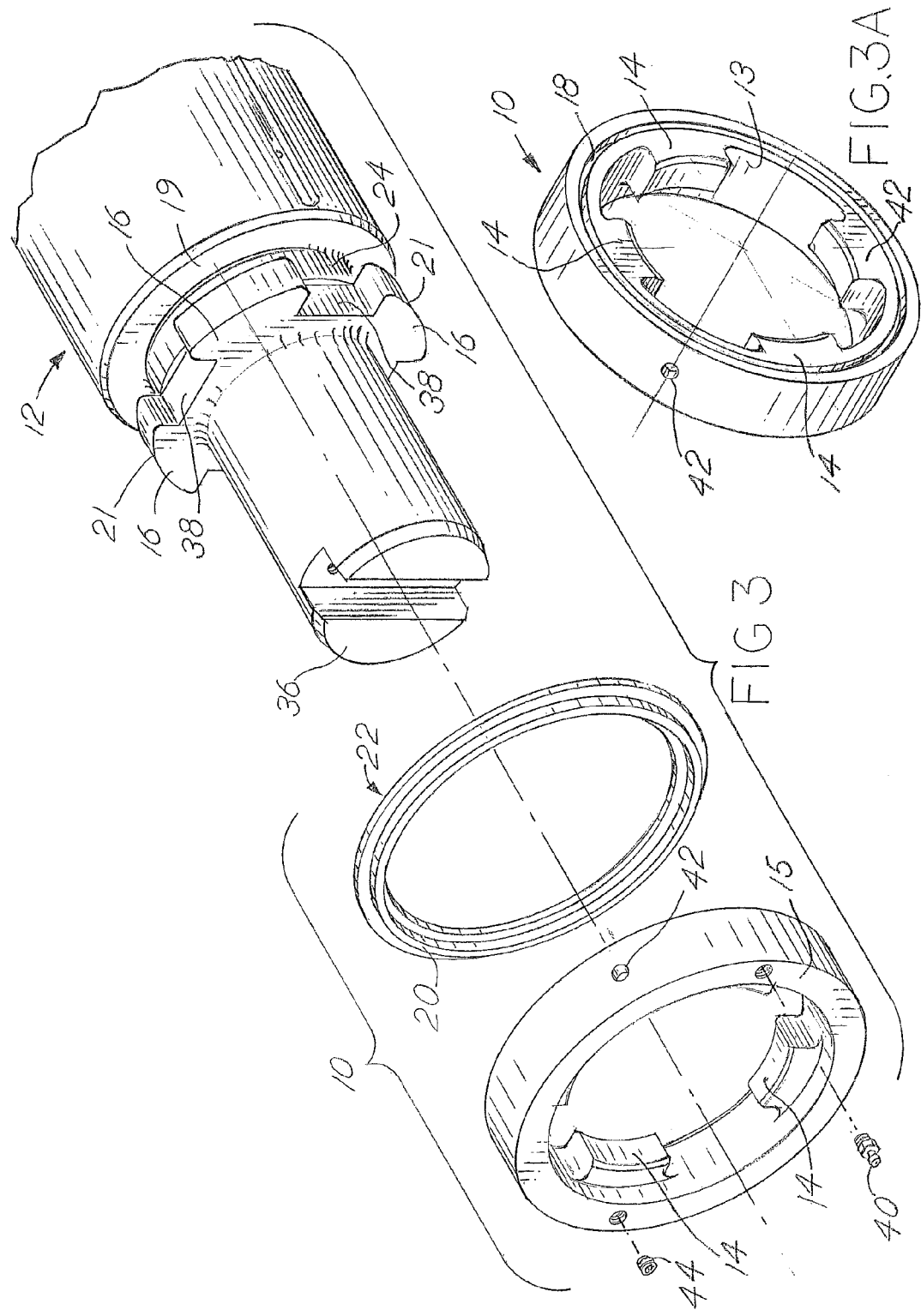

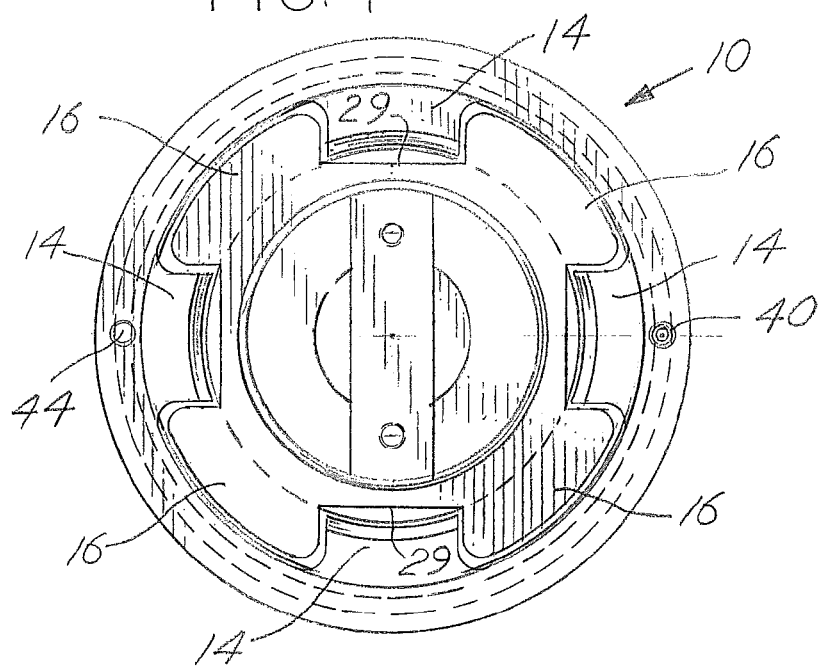
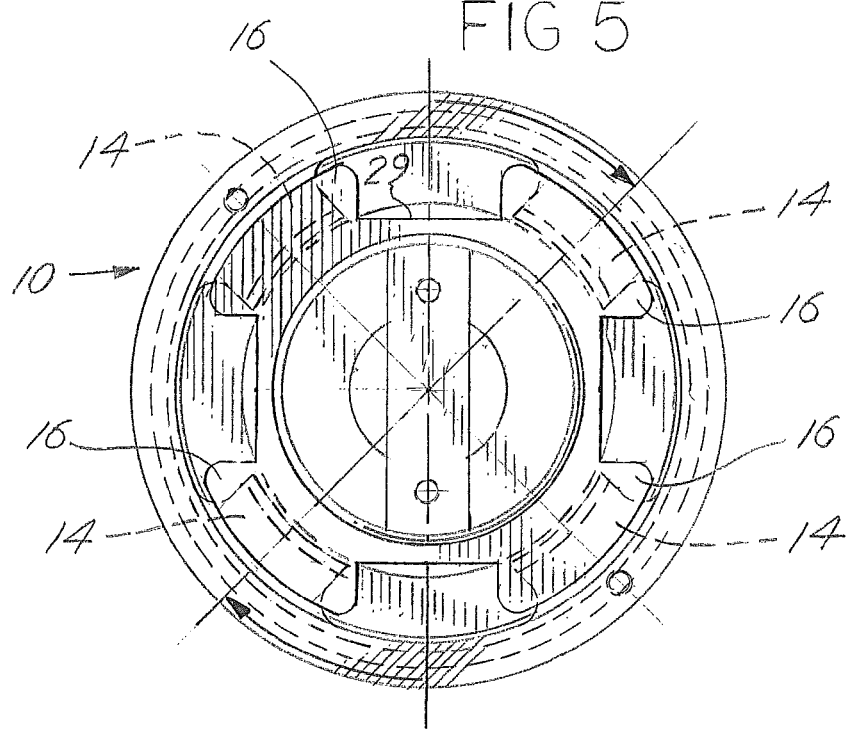

TOOL LOCKING SYSTEM

CROSS-REFERENCE TO RELATED APPLICATION

This is a continuation of U.S. patent application Ser. No. 11/754,100 filed May 25, 2007.

BACKGROUND OF THE INVENTION

Tooling on roll forming and slitter arbors has traditionally been held onto the arbor by using a threaded nut on the end of the arbor that receives the tooling. The threaded nut must have mating threads that are machined into the end of each arbor. These threads on the arbor are subject to damage as tooling is loaded onto the arbor, the nut is threaded upon the arbor or removed from the arbor, or just by being exposed in the work place. Damaged threads can require costly maintenance to restore to a working condition. Therefore, there is a need for a more robust system to hold tooling on arbors that does not require threads.

SUMMARY OF THE INVENTION

The present invention is an arbor tool locking system. The system uses a flanged nut that rotatably engages a keyed collar on the arbor. The collar forms a part of the arbor and is spaced from that part of the arbor that carries the tooling. The nut is slid over the collar and partially rotated to cause the nut flanges to be positioned between the collar and the tooling upon the arbor with the nut compressed against the tooling.

An object of the invention is to provide a locking mechanism to hold tooling on arbors without the use of screw threads.

Another object of the invention is to provide a locking mechanism for tooling of a roll former and slitter which can be economically maintained and of rapid operation.

Still other objects of the invention will become apparent upon reading the following description.

BRIEF DESCRIPTION OF THE DRAWINGS

A preferred embodiment of this invention has been chosen wherein:

FIG. 3 is a perspective exploded view of the slitter tool lock;

FIG. 3A is a perspective view of the nut of the tool lock shown in assembled form;

FIG. 4 is a view of the end of an arbor with the nut installed in its released position; and FIG. 5 is a view of the end of an arbor with the nut installed in its locked position rotated 45 degrees from the position shown in FIG. 4.

DETAILED DESCRIPTION OF INVENTION

Figure 1:
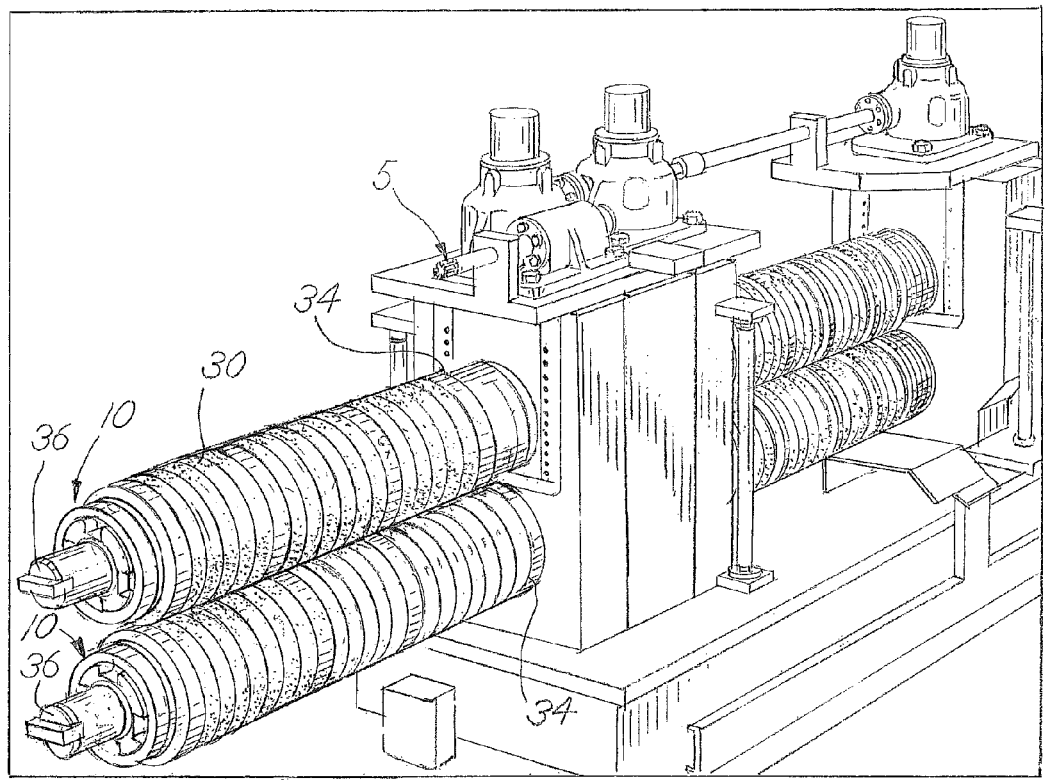
FIG. 1 is a perspective view of a slitter with tooling stacked and locked on the arbors.

The tool locking system of this invention includes a nut 10 and a collar 11 forming a component of arbor 12. Arbor 12 is shown as forming a part of a slitter 5. The nut 10 has equally radially spaced flanges or bosses 14 that protrude toward the inside of the nut as shown in FIG. 3A. Flanges 14 are inwardly spaced from outer edge face 15 of the nut. Nut 10 has an annular groove 18 formed in its inner edge face 17 as shown in FIG. 3A. The annular groove 18 in the nut receives a pressure ring 22. A bore 23 extends in nut 10 into groove 18 behind ring 22. A grease zerk fitting 40 is located in bore 23 at face 15. Pressure ring 22 forms what is also known in the trade as a Jetnut. A ball check valve 44 is also located at face 15 in a bore 25 into groove 18. Collar 11 is attached to or forms an intregal part of arbor 12 and includes a plurality of equal radially spaced coplanar flanges 16 spaced just slightly more than the thickness of nut flanges 14 from shoulder 19 of the arbor 12.

The outer diameter of collar 11 at the ends 21 of the flanges 16 is less than the major diameter 26 of the arbor to allow tooling 30, in the form of cutters and spacers, to pass over the flanges 16 at the end of the arbor 12. This outer diameter of collar 11 is also less than the inner diameter of nut inner surface 13.

Figure 2:
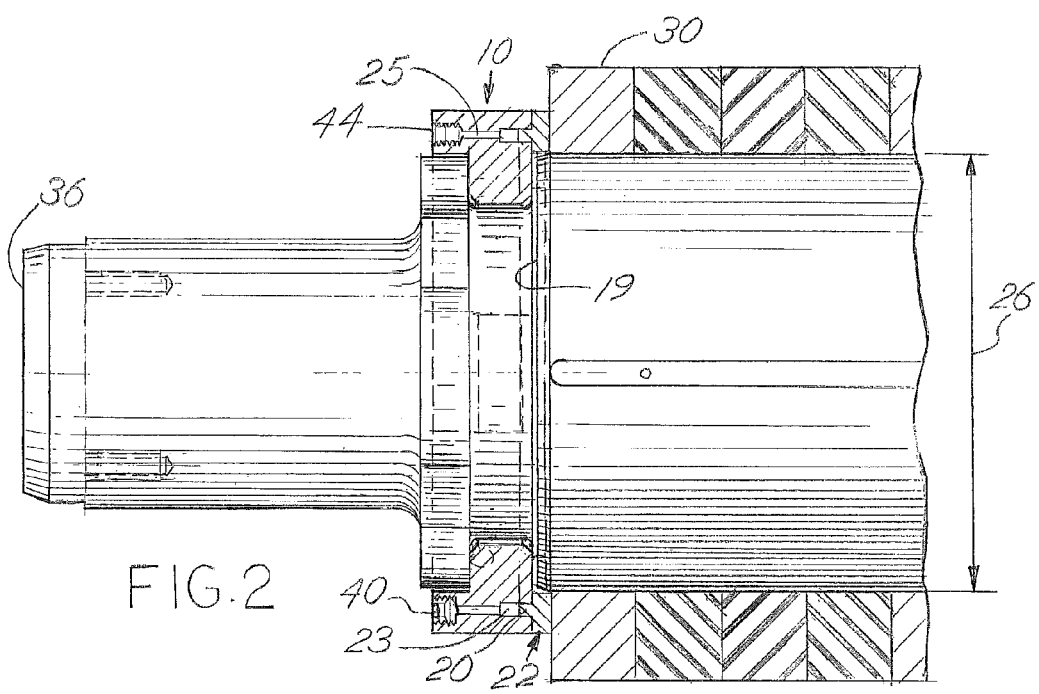
FIG. 2 is a fragmentary side view of an arbor end in partial sectional form.

Tooling 30 is stacked on the arbors 12, as shown in FIG. 1, until the arbors are full from the inner shoulder 34 to the outer shoulder 19 of the arbor. FIG. 2 shows a sectional view of a full arbor 12 near the open end 36 of the arbor. Once the arbor 12 is full of tooling 30, the nut 10 is inserted upon the open end 36 of the arbor with the flanges 14 on the nut 10 lining up with the spaces 38 between the flanges 16 on the arbor 12. The nut 10 is pushed onto the arbor end until pressure ring 22 preferably abuts arbor shoulder 19. This position is shown in FIG. 4 and is the nut's unlocked position. The depth of flanges 14 are such that the flanges clear the root face 29 of collar 11 between flanges 16. The nut 10 is then turned 45 degrees to its locked position, as show in FIG. 5, so that the flanges 14 of the nut are then between the flanges 16 of the collar and shoulder 19 of the arbor 12. A hole 42 is provided in the side of the nut 10 in which a rod or spanner wrench may be inserted to assist in turning the nut 10. In the 45 degree rotated position shown in FIG. 5, a grease gun is then used to force grease into groove 18 of the nut through fitting 40. The pressurized grease causes the pressure ring 22 to forcefully press against the tooling 30, thereby securing the tooling 30 in place on the arbor and locking the nut 10 against collar 11. To unlock the nut 10, check valve 44 is open to release the pressure upon the grease in chamber 23 which causes pressure ring 22 to no longer forcefully push against the tooling 30. This allows nut 10 to be turned into its released position, as shown in FIG. 4, where it can be removed to free the tooling 40 for replacement.

The above described invention is not to be limited to the details given but may be modified within the scope of the following claims.

What is claimed is:

1. A locking system for securing tooling on a slitter arbor comprising:

a collar spaced from said tooling and spaced flanges on said collar, and a nut having spaced internal flanges, said nut being slidable over said collar with said internal flanges passing between said collar flanges as said nut is slid over said collar into a first position wherein said nut is positioned adjacent said tooling and said nut being rotatable relative to said collar from said first position into a second position wherein the internal flanges are secured between the collar and the tooling, said nut having a groove, said groove receiving a pressure ring to form a chamber within said nut, said chamber receiving a pressure forming source to extend said pressure ring apart toward said tooling on said arbor when said nut is in its second position.

* * * * *